March 24, 1953  L. H. FLORA  2,632,217

SEPARABLE CLAMPING DEVICE

Filed March 4, 1952

INVENTOR
LAURENCE H. FLORA

BY  H. G. Lombard
ATTORNEY

Patented Mar. 24, 1953

2,632,217

UNITED STATES PATENT OFFICE 2,632,217

SEPARABLE CLAMPING DEVICE

Laurence H. Flora, Cleveland, Ohio, assignor to Tinnerman Products, Inc., Cleveland, Ohio, a corporation of Ohio Application March 4, 1952, Serial No. 274,784

14 Claims. (Cl. 24—16)

This invention relates in general to improvements in clamps and clamping devices for holding objects of various sizes on a support and, is directed, more particularly, to such devices which are used in aircraft and other structures for supporting groups of electrical wires, conduits, and similar elongate objects at spaced points along the path in which the objects extend in mounted position in such structures.

A highly advantageous form of such clamp or clamping device which is especially suited for supporting objects of different sizes in a wide range and variety of applications and uses, involves the provision of a flexible strap together with a retainer to which one end of the strap is fixed while the remainder of the strap extends free for readily embracing any size object in the range intended with the free end of the strap adapted to be drawn taut and adjustably secured by said retainer to mount the object supported firmly and rigidly in a completed installation.

In many instances, such a clamp or clamping device is required in which the strap may be adjusted in relatively small increments but with the free end of the strap positively held by the retainer in any secured position against slippage or loosening under excessive vibration and the like taking place under the most severe service conditions. For example, in the mounting of a bundle of electrical wires, where it is frequently necessary to add to or remove a wire or two of the bundle, any such change in the installation requires a corresponding slight change in the position in which the strap is secured to support the bundle of wires firmly and rigidly in the most effective manner. At the same time, it is most important, of course, that the free end of the strap be positively retained against any possible loosening or slippage in any secured position, especially where there is any danger in this regard, as when the bundle of wires or other object supported is relatively heavy, for example.

A primary object of this invention, accordingly, is to provide a clamp or clamping device of the kind described which comprises a retainer adapted to provide a direct clamping force on the flexible strap to retain the free end portion thereof against slippage or loosening in a completed installation.

Another object of the invention is to provide a clamp or clamping device of this character in which the retainer embodies a screw or bolt for actuating a clamping member providing the direct clamping force on the strap to hold the same against slippage or loosening.

A further object of the invention is to provide a clamp or clamping device having a retainer or holder such as described, together with a flexible strap having the engaging surfaces formed with interlocking serrations which positively lock the strap against slippage under the direct clamping force of the clamping member of the retainer, and, more particularly, with said clamping member actuated by a screw or bolt actuating means.

Further objects and advantages, and other new and useful features in the construction and general arrangement of parts of the invention will be readily apparent as the following description proceeds with reference to the accompanying drawings, for purposes of illustration but not of limitation, in which like reference characters designate like parts throughout, and in which.

Figure 1:
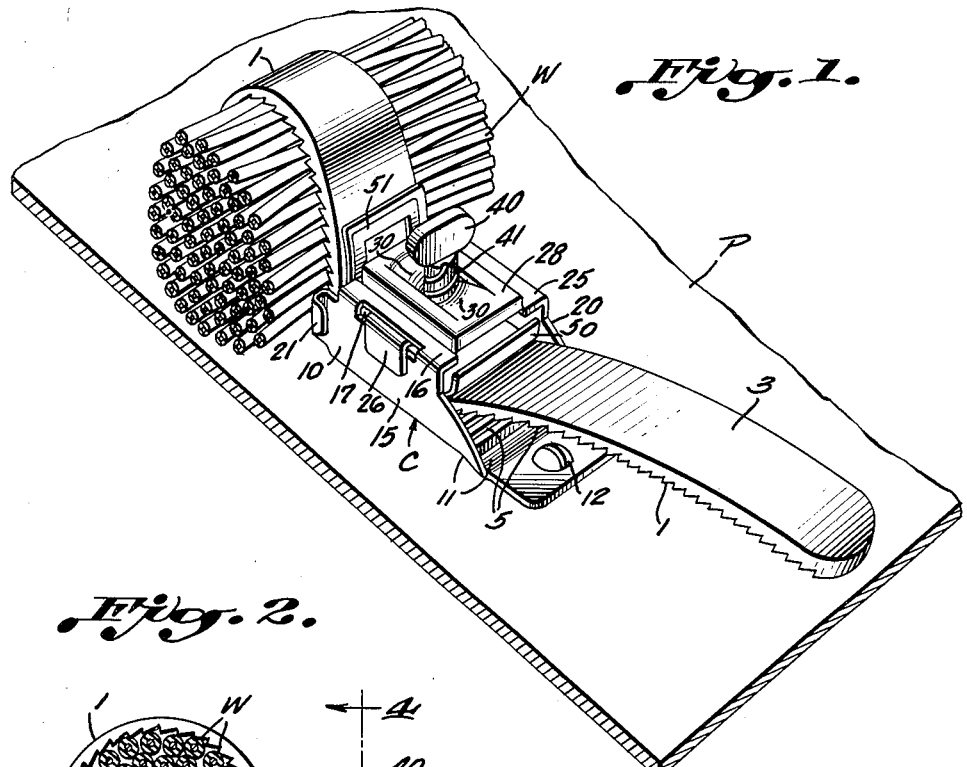
Fig. 1 is a perspective view of a clamp or clamping device in accordance with the invention, showing the same attached to a support and holding a bundle of electrical wires in secured position on said support.

Referring now, more particularly, to the drawings, the clamp or clamping device of the invention is shown as employed to hold or mount a bundle of electrical wires W in desired position on a panel P or other support. The clamp device is used in the same general manner for holding or mounting any other similarly elongate object such as a conduit or one or more cables, or the like, it being understood that as many of the clamps as are necessary are employed to hold the object at spaced points along the path which the same extends in operative position in a completed installation.

In a preferred construction, the clamp or clamp device of the invention, designated generally C, comprises a retainer or holder in the form of a housing or body member 10 in which the associated strap member 1 is adjustably secured and retained, as presently to be described. The housing 10 is a relatively simple device provided from a suitable sheet metal blank which is bent to form a base 11 intermediate a pair of substantially similar side portions 15 and 20 extending upwardly from said base 11. The base 11 is provided with an extension having an aperture for receiving a screw, rivet or other fastening 12 for securing the clamp to the support in any suitable way. The intermediate area of the base 11 is provided with a pair of oppositely directed hooks 13 which are stamped upwardly out of the plane of said base 11 in position to extend through a pair of spaced holes 2 in the fixed end of the strap 1 to secure such end of the strap within the housing 10 of the retainer. If desired, the hooks 13 may be omitted and the fixed end of the strap 1 secured by the same screw or rivet 12 which secures the base 11 of the retainer to the support P.

Figure 3:
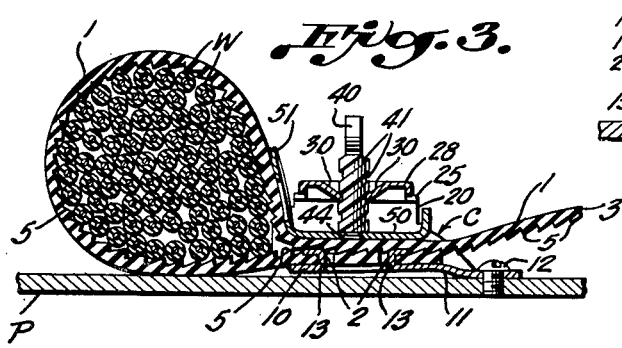
Fig. 3 is a sectional view on the vertical transverse plane through the center of the clamping device as shown in Fig. 2, and along line 3—3 of Fig. 4, looking in the direction of the arrows; and, Fig. 4 is a sectional view of Fig. 2 along line 4—4, looking in the direction of the arrows.

To hold the free end 3 of the strap 1 against slippage in a positively locked engagement with the fixed end portion of the strap, said strap 1 preferably is provided with interlocking shoulders, or serrations in the form of saw-teeth 5, or the like, formed on the inner surface of the strap. Each tooth 5 has one face lying in a plane which extends substantially normal to the plane of the outer surface of the strap, and has its other face inclined from the point of the tooth to the base of an adjacent tooth. Additionally, the inclined faces extend in such manner that said inclined faces slope upwardly toward the fixed end of the strap as is shown in Fig. 3. Thus, the inclined faces of the teeth 5 slide freely over each other whenever the free end 3 of the strap is passed over the fixed end of the strap as said strap is pulled tightly around the bundle of wires W or other object in completing an installation.

Figure 2:
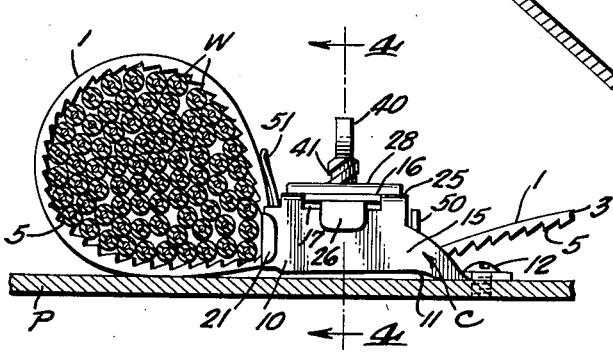
Fig. 2 is a side elevational view of the installation shown in Fig. 1.
Figure 4:
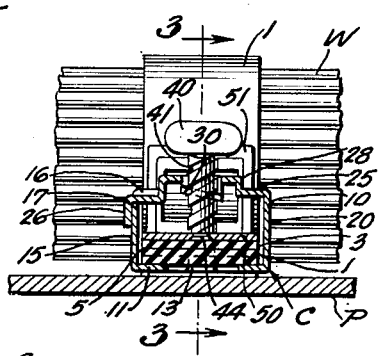

Adjoining the base 11, the side 15 of the retainer is formed from one end of said blank to include an inwardly extending flange 16, Fig. 4, and a slot 17, Fig. 2, adjacent said flange 16. The opposite side 20 of the retainer is provided from the other free end of the blank and carries a top portion 25 which extends across the space between said sides 15 and 20 and terminates in a flap 26 which is received in the slot 17 in the side portion 15 to connect said side portions 15 and 20 in a rigid box-like housing construction. Preferably, the substantially similar sides 15 and 20 are provided with a pair of forward ears 21 which are rolled outwardly to define rounded surfaces which will not cut or otherwise damage the wires W adjacent thereto in the operative position of the retainer in a completed installation. If desired, the rounded ears 21 may be provided with a coating of neoprene as a cushion which will prevent damage to the wires adjacent said ears 21 as a result of chafing or rubbing effects caused by vibration in the installation.

As best seen in Figs. 2 and 4, the connection of the top portion 25 with the side portion 15 is such that the adjacent end of said top portion 25 underlies the inturned flange 16 to resist the lifting force transmitted thereto when the clamping screw 40 is tightened, as presently to be described. The connection otherwise is permanently locked by the flap 26 received in the slot 17 and bent into flush relation with the outer surface of the side portion 15.

The top portion 25 preferably has its intermediate area offset upwardly to define a generally rectangular plate-like head or dome 28 making for added strength in such area and increasing the spacing thereof from the retainer base 11 to provide for greater travel of the clamping screw 40 carried by said head or dome 28. However, the said top portion 25 may be substantially flat, if desired, and provided with any suitable means for threadedly engaging the clamping screw or bolt 40.

Preferably the means for threadedly engaging the clamping screw or bolt 40 are provided by a pair of tongues 30 formed by a pair of spaced parallel slits on opposite sides of a thread opening stamped in said plate-like head or dome 28, and the ends of said tongues 30 bent downwardly within the housing 10 with the extremities thereof spaced apart and shaped to lie on a helix corresponding to the helix of the threads on the clamping screw 40 for uniform threaded engagement therewith in the most effective manner.

Such thread engaging means may be pressed, stamped, extruded, or otherwise provided on said top portion 25 of the retainer in any suitable form or construction so long as the same threadedly engage with the thread of the clamping screw 40 and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging said clamping screw 40. However, the thread engaging means prepared in the form of cooperating, yieldable tongues 30 as shown, are possessed of unusual inherent strength and will not collapse or pull through when the screw 40 is tightened, nor loosen under continuous strain and vibration in the installation. This takes place by reason of the fact that the sheet metal material from which such tongues 30 are formed is of less thickness than the pitch or spacing between adjacent thread convolutions of the screw 40, wherefore the extremities of said tongues 30 tend, more effectively, to move toward each other and dig into the grooves intermediate adjacent thread convolutions of the screw when tightened and otherwise become embedded in the root of the screw in locked, frictional fastening engagement therewith, thereby providing an automatic thread lock on the screw or bolt 40 in any tightened position thereof which prevents accidental loosening thereof under the most severe conditions of vibration.

In the present example, the clamping screw or bolt 40 is shown provided as a thumb screw having a thread of relatively high pitch whereby the screw may be quickly actuated to either limit of its travel by relatively little turning such as approximately a full turn, more or less. This has been found to be most effectively accomplished by providing the screw 40 with a double thread 41 of high pitch and substantially similar to a square or acme thread having relatively pronounced thread surfaces which advantageously ensure a positive threaded engagement of the tongues 30 therewith under any practical amount of tightening force on the screw 40 in performing its intended clamping action.

The lower end of the thumb screw 40 is provided with a cylindrical projection 44 which is received in a central opening in a clamping plate 50 and peened in attached relation with said clamping plate 50 in a manner whereby said screw 40 is rotatable relatively to said plate 50 with the plate attached thereto. Thus, the turning of the thumb screw 40 in a clockwise direction lowers said clamping plate 50 toward the retainer base 11 in the direction for effecting a clamping action of said clamping plate 50, hile a reverse turning of said screw 40 in a counter-clockwise direction raises said clamping plate 50 out of said clamping position.

As seen in Fig. 4, the clamping plate 50 is of a said clamping plate 50, while a reverse turning of width slightly less than the spacing between the side portions 15 and 20 of the retainer or housing 10 and extends lengthwise within said housing with sufficient clearance to provide for ready upward or downward movement in said housing as actuated by turning of the thumb screw 40. The ends of said clamping plate 50 are bent upwardly or otherwise formed to define blunt or rounded surfaces which will not damage the strap 1 when said clamping plate 50 is advanced into clamping engagement with said strap 1.

Preferably, the clamping plate 50 is provided in the form of a generally L-shaped member having an enlarged forward end defining a guide lip 51 which projects upwardly in position for facilitating the insertion and guiding of the free end of the strap 1 within the housing 10 of the clamp. This guide lip 51 also serves to provide added tension in the loop portion of the strap 1 by compressing said loop portion when the clamping plate 50 is advanced to clamping position, and otherwise acts as a shelf to support the bundle of wires in instances where the wires are disposed in a reverse position above the housing member 10 of the clamp, as illustrated in Fig. 1. For example, in an airplane installation, in any maneuver in which the airplane is in or near an inverted position, the aforesaid guide lip 51 serves as a shelf on which the bundle of wires W is adapted to rest firmly and rigidly in a manner which eliminates shaking and flopping of the wires in such inverted position of the airplane.

In the completed form of the clamp, one end of the flexible strap 1 is provided with the spaced holes 2 which are readily slipped over the spaced hooks 13 on the retainer base 11, the strap being readily stretched as necessary for this purpose. The clamp as thus completed may be mounted in an installation on the support P by the screw 12 or other suitable fastener either before or after the bundle of wires W is secured by the clamp. In either case, the thumb screw 40 is turned counter-clockwise as necessary to retract the clamping plate 50 to the limit of its upward movement in the housing 10. After the free end portion 3 of the strap has been looped around the bundle of wires W, said free end is passed beneath the guide lip 51 which readily directs the strap under the clamping plate 50 and through the housing 10, whereupon the said free end of the strap is pulled to tighten the loop around the bundle of wires W as necessary or desirable.

The clamping action is then completed by turning the thumb screw 40 in a clockwise direction which lowers the clamping plate 50 into direct clamping engagement with the free end portion of the strap 1 overlying the fixed end of the strap, as shown in Figs. 3 and 4. In the tightened position of said clamping plate 50, the guide lip 51 carried thereby bears upon the adjacent surface of the previously tightened loop portion of the strap as shown in Figs. 2 and 3, to provide added tension in said loop portion in a manner which prevents flopping of the wires when the clamp is disposed in inverted positions, and the like, as previously explained.

The thumb screw 40, in fully tightened position, exerts a direct clamping force on the superposed portions of the strap 1 such that the engaging saw teeth 5 on said strap mate together with the shoulders of said saw-teeth in abutting relation in a manner which positively prevents slippage or loosening of the strap from any secured position thereof.

At the same time, in the fully tightened position of the thumb screw 40, the tongues 30 in threaded engagement therewith effect an automatic thread locking on said screw 40 under the reverse axial force set up on said thumb screw 40 when tightened in clamping position. The action is such that the extremities of said tongues 30 are forced inwardly toward each other as said thumb screw 40 is tightened, thereby providing a tensioned biting engagement of the tongue extremities with the root of said thumb screw 40 in a manner which prevents any accidental or unintended reverse turning or loosening of said thumb screw 40 from tightened position in a completed installation.

The clamp or clamp device preferably is provided with the housing 10 and clamping plate 50 made of relatively thin sheet metal the thickness of which is selected according to service requirements and the predetermined range of sizes of the objects with which the clamp is intended to be used. The sheet metal members of the clamp are most effective when provided of spring metal suitably tempered and otherwise treated to give the desired toughness and hardness, particularly when the devices are provided for use in heavy duty applications. A cheap but effective clamping device may be provided with said sheet metal parts formed from cold rolled metal such as cold rolled steel which is untempered but of a spring metal nature and capable of providing an effective and reliable clamp or clamping device in accordance with the invention.

While the invention has been described in detail with a specific example, such example is intended as an illustration only inasmuch as the invention fully contemplates various modifications which may be provided without departing from the spirit and scope of the invention.

What is claimed is:

1. In a device comprising a strap or the like adapted to be formed into a loop around an object to be secured, a retainer comprising a housing for securing portions of said strap extending within said housing from adjacent said loop, said housing comprising a piece of sheet metal bent to define an integral, one-piece base and sides and a top in overlying spaced relation to said base, one of said sides having a slot and said top having a flap received in and secured in said slot, and means within said housing adapted to cooperate with said base in clamping said portions of said strap extending within said housing.

2. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, a movable plate within said housing adapted to cooperate with said base in clamping said portions of said strap extending within said housing, said plate having an extension projecting outside of said housing at one end adapted to bear upon said loop of the strap when said plate is in clamping position, thread engaging means on said top of the housing for threadedly engaging a threaded stud, and a threaded stud threaded with said thread engaging means and engaging said plate.

3. In a device comprising a strap or the like adapted to be formed into a loop around an object to be secured, a retainer comprising a housing for securing portions of said strap extending within said housing from adjacent said loop, said housing comprising a piece of sheet metal bent to define an integral, one-piece base and sides and a top in overlying spaced relation to said base, one of said sides having a slot and said top having a flap received in and secured in said slot, a movable plate within said housing adapted to cooperate with said base in clamping said portions of said strap extending within said housing, thread engaging means on said top of the housing for threadedly engaging a threaded stud, and a threaded stud threaded with said thread engaging means and engaging said plate.

4. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, one of said sides having a slot and said top having a flap received in and secured in said slot, a movable plate within said housing adapted to cooperate with said base in clamping said portions of said strap extending within said housing, said plate having an extension projecting outside of said housing at one end adapted to bear upon said loop of the strap when said plate is in clamping position, thread engaging means on said top of the housing for threadedly engaging a threaded stud, and a threaded stud threaded with said thread engaging means and engaging said plate.

5. In a device comprising a strap or the like adapted to be formed into a loop around an object to be secured, a retainer comprising a housing for securing portions of said strap extending within said housing from adjacent said loop, said housing comprising a piece of sheet metal bent to define an integral, one-piece base and sides and a top in overlying spaced relation to said base, one of said sides terminating in an inwardly extending flange and having a slot adjacent said flange, said top having a portion underlying said flange and a flap received in and secured in said slot, a movable plate within said housing adapted to cooperate with said base in clamping said portions of said strap extending within said housing, thread engaging means integrally formed in said top for threadedly engaging a threaded stud, and a threaded stud threadedly engaged with said thread engaging means and connected to said plate.

6. In a device comprising a strap or the like adapted to be formed into a loop around an object to be secured, a retainer comprising a housing for securing portions of said strap extending within said housing from adjacent said loop, said housing comprising a piece of sheet metal bent to define an integral, one-piece base and sides and a top in overlying spaced relation to said base, one of said sides having a slot and said top having a flap received in and secured in said slot, a movable plate within said housing adapted to cooperate with said base in clamping said portions of said strap extending within said housing, thread engaging means integrally formed in said top for threadedly engaging a threaded stud, and a threaded stud threadedly engaged with said thread engaging means and connected to said plate.

7. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, one of said sides having a slot and said top having a flap received in and secured in said slot, a movable plate within said housing adapted to cooperate with said base in clamping said portions of said strap extending within said housing, said plate having an extension projecting outside of said housing at one end adapted to bear upon said loop of the strap when said plate is in clamping position, thread engaging means integrally formed in said top for threadedly engaging a threaded stud, and a threaded stud threadedly engaged with said thread engaging means and connected to said plate.

8. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, one of said sides having a slot and said top having a flap received in and secured in said slot, said top being provided with an outwardly offset dome and thread engaging means integrally formed in said dome for threadedly engaging a threaded stud, a threaded stud threadedly engaged with said thread engaging means, and means actuated by said threaded stud adapted to provide a clamping force on said portions on said strap extending within said housing.

9. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, one of said sides having a slot and said top having a flap received in and secured in said slot, said top being provided with an outwardly offset dome and thread engaging means integrally formed in said dome for threadedly engaging a threaded stud, a movable plate within said housing adapted to cooperate with said base in clamping said portions of said strap extending within said housing, thread engaging means integrally formed in said dome for threadedly engaging a threaded stud, and a threaded stud threadedly engaged with said thread engaging means and engaging said plate.

10. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, one of said sides having a slot and said top having a flap received in and secured in said slot, said top being provided with an outwardly offset dome and thread engaging means integrally formed in said dome for threadedly engaging a threaded stud, a movable plate within said housing adapted to cooperate with said base in clamping said portions of said strap extending within said housing, said plate having an extension projecting outside of said housing at one end adapted to bear upon said loop of the strap when said plate is in clamping position, thread engaging means integrally formed in said dome for threadedly engaging a threaded stud, and a threaded stud threadedly engaged with said thread engaging means and rotatably connected to said plate.

11. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, one of said sides having a slot and said top having a flap received in and secured in said slot, said top being provided with an outwardly offset dome thread engaging means carried by said dome, and a bolt or screw having a double thread of relatively high pitch threadedly engaged with said thread engaging means, and means actuated by said bolt or screw adapted to provide a clamping force on said portions of said strap extending within said housing.

12. In a device comprising a strap or the like adapted to be formed into a loop around an object to be secured, a retainer comprising a housing for securing portions of said strap extending within said housing from adjacent said loop, said housing comprising a piece of sheet metal bent to define a base and sides and a top in overlying spaced relation to said base, one of said sides having a slot and said top having a flap received in and secured in said slot, said top being provided with an outwardly offset dome and thread engaging means integrally formed in said dome for threadedly engaging a bolt or screw, a movable plate within said housing adapted to cooperate with said base in clamping said portions of said strap extending within said housing, said plate having an extension projecting outside of said housing at one end adapted to bear upon said loop of the strap when said plate is in clamping position, and a bolt or screw having a double thread of relatively high pitch threadedly engaged with said thread engaging means and rotatably connected to said plate.

13. A device comprising a flexible strap adapted to be formed into a loop around an object to be secured, said strap having its inner surface provided with serrations defining shoulders adapted to interlock when portions of the inner surface of said strap are brought into contiguous engagement, a retainer comprising a housing for securing portions of said strap extending within said housing in such contiguous engagement from adjacent said loop, said housing comprising a piece of sheet metal bent to define a base and sides and a top in overlying spaced relation to said base, a threaded stud carried by said top of the retainer, and means actuated by said threaded stud adapted to provide a clamping force on said portions of said strap in contiguous engagement within said housing.

14. A device comprising a flexible strap adapted to be formed into a loop around an object to be secured, said strap having its inner surface provided with saw-teeth extending generally transversely thereof and defining shoulders substantially normal to the outer surface of said strap, said shoulders being adapted to interlock when portions of the inner surface of said strap are brought into contiguous engagement, a retainer comprising a housing for securing portions of said strap extending within said housing in such contiguous engagement from adjacent said loop, said housing comprising a piece of sheet metal bent to define a base and sides and a top in overlying spaced relation to said base, a movable plate within said housing adapted to cooperate with said base in clamping said portions of said strap extending within said housing, and a threaded stud carried by said top of the housing and engaging said plate to provide said plate with clamping force on said portions of said strap in contiguous engagement within said housing.

LAURENCE H. FLORA.

REFERENCES CITED

The following references are of record in the file of this patent:

UNITED STATES PATENTS

| Number | Name | Date |
|---|---|---|
| 1,173,998 | Depew | Feb. 29, 1916 |
| 1,199,052 | Crawford | Sept. 26, 1916 |
| 1,804,725 | Walker | May 12, 1931 |
| 2,345,279 | Morehouse | Mar. 28, 1944 |
| 2,491,290 | Tinnerman | Dec. 13, 1949 |

FOREIGN PATENTS

| Number | Country | Date |
|---|---|---|
| 587,083 | Germany | Oct. 30, 1933 |